United States Patent
Nam

(10) Patent No.: US 9,587,547 B2
(45) Date of Patent: Mar. 7, 2017

(54) ENGINE SYSTEM FOR CONTROLLING EXHAUST GAS FLOW

(71) Applicant: HYUNDAI MOTOR COMPANY, Seoul (KR)

(72) Inventor: Kihoon Nam, Gunpso-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/827,033

(22) Filed: Aug. 14, 2015

(65) Prior Publication Data
US 2016/0138465 A1    May 19, 2016

(30) Foreign Application Priority Data

Nov. 14, 2014 (KR) .................. 10-2014-0158777

(51) Int. Cl.
*F01N 3/00* (2006.01)
*F01N 9/00* (2006.01)
*F01N 3/021* (2006.01)

(52) U.S. Cl.
CPC .............. *F01N 9/00* (2013.01); *F01N 3/021* (2013.01); *F02M 26/05* (2016.02); *F02M 26/06* (2016.02); *F02M 26/07* (2016.02); *F02M 26/17* (2016.02); *F02M 26/22* (2016.02); *F02M 26/52* (2016.02); *F01N 2410/00* (2013.01); *F02M 26/23* (2016.02)

(58) Field of Classification Search
USPC ......... 60/274, 278, 280, 285, 287, 288, 289, 60/293, 295, 298, 301, 324
See application file for complete search history.

(56) References Cited

U.S. PATENT DOCUMENTS 7,600,372 B2 * 10/2009 Nishiumi ................ F01N 3/023
60/280
8,225,596 B2 * 7/2012 Toshioka .............. F01N 3/0835
60/281
8,490,387 B2    7/2013 Schreiber
(Continued)

FOREIGN PATENT DOCUMENTS

JP     2004-533576 A    11/2004
JP     2010-203291 A     9/2010
(Continued)

*Primary Examiner* — Binh Q Tran
(74) *Attorney, Agent, or Firm* — McDermott Will & Emery LLP

(57) ABSTRACT

An engine system for controlling an exhaust gas flow includes an intake line arranged to draw in outdoor air, an engine combusting the outdoor air supplied through the intake line and fuel in a combustion chamber of the engine to generate torque, an exhaust line for exhausting exhaust gas from the combustion in the combustion chamber of the engine, a turbocharger having a turbine operated by the exhaust gas passing through the exhaust line and a compressor for compressing the outdoor air in the intake line, a catalyst unit arranged on a downstream side of the turbocharger for reducing harmful components of the exhaust gas, a bypass line branched from the exhaust line on the downstream side of the turbocharger and joined to the exhaust line on a downstream side of the catalyst unit, and a bypass valve arranged on the bypass line for selectively opening/closing the bypass line.

9 Claims, 4 Drawing Sheets

(56) References Cited

U.S. PATENT DOCUMENTS

| | | | | |
|---|---|---|---|---|
| 8,726,639 | B2 * | 5/2014 | Stroia | F01N 3/0253 60/274 |
| 8,828,342 | B1 * | 9/2014 | Tyo | F01N 3/2053 423/213.2 |
| 9,157,356 | B2 * | 10/2015 | Balthes | F01N 3/023 |

FOREIGN PATENT DOCUMENTS

| | | |
|---|---|---|
| KR | 10-1998-0038965 U | 9/1998 |
| KR | 10-2003-0086358 A | 11/2003 |
| KR | 10-2012-0085410 A | 8/2012 |

* cited by examiner

ENGINE SYSTEM FOR CONTROLLING EXHAUST GAS FLOW

CROSS-REFERENCE TO RELATED APPLICATION

This application claims priority to and the benefit of Korean Patent Application No. 10-2014-0158777 filed in the Korean Intellectual Property Office on Nov. 14, 2014, the entire contents of which are incorporated herein by reference.

TECHNICAL FIELD

The present disclosure relates to an engine system for controlling an exhaust gas flow for securely maintaining a purification rate of exhaust gas by securely maintaining a temperature of a diesel oxidation catalyst (DOC) or a diesel particulate filter (DPF) in an overrun condition of an engine.

BACKGROUND

Presently, in order to meet exhaust gas regulations on a passenger diesel engine, a diesel oxidation catalyst (DOC), a diesel particulate filter (DPF), a lean NOx trap (LNT), and a selective catalytic reduction (SCR) unit are taken into account.

A post processing system mounted for reduction of the exhaust gas, such as the DOC, LNT, and SCR unit, requires a base temperature for chemical reaction.

In general, in a cold engine state (coolant temperature below 90° C.), when an exhaust gas temperature is low, excessive exhaust emissions are exhausted before the post processing system is activated. Consequently, an exhaust gas temperature increasing strategy is used for reducing the cold state exhaust gas even though fuel consumption is sacrificed.

However, although raising the exhaust gas temperature is possible by using a burning strategy, since intake air is discharged without a burning process, resulting in cooling down of the post processing system in a case of the overrun (coasting, or an imperfect combustion state), the temperature of the post processing system is lowered, delaying a time period for reaching the activation temperature.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide an engine system for controlling an exhaust gas flow having advantages of securely maintaining a purification rate of exhaust gas.

An object of the present invention is to provide an engine system for controlling an exhaust gas flow, in which a temperature drop of a catalyst unit is prevented when imperfectly combusted exhaust gas passes the catalyst unit like in an overrun condition, for improving quality of the exhaust gas on the whole.

To achieve the object of the present invention, an engine system for controlling an exhaust gas flow may include an intake line arranged to draw in outdoor air, an engine for combusting the outdoor air supplied through the intake line and fuel in a combustion chamber of the engine to generate torque, an exhaust line for exhausting exhaust gas from the combustion in the combustion chamber of the engine, a turbocharger having a turbine operated by the exhaust gas passing through the exhaust line and a compressor for compressing the outdoor air in the intake line, a catalyst unit arranged on a downstream side of the turbocharger for reducing harmful components of the exhaust gas, a bypass line branched from the exhaust line on the downstream side of the turbocharger and joined to the exhaust line on a downstream side of the catalyst unit, and a bypass valve arranged on the bypass line for selectively opening/closing the bypass line.

The engine system may further include a control unit for selectively opening/closing the bypass valve.

If a condition is met in which the fuel is not injected into the engine and a rotation speed of the engine is higher than a preset speed, the control unit may open the bypass valve so that the exhaust gas bypasses the turbocharger and the catalyst unit. If the condition is not met, the control unit may close the bypass valve.

The control unit may control the bypass valve based on an analysis of an accelerator pedal signal, a coolant temperature of the engine, a vehicle speed, and a signal of a lambda sensor arranged between the turbocharger and the engine.

The engine system may further include a high pressure exhaust gas recirculation (EGR) line branched from the exhaust line between the turbocharger and the engine for re-cycling the exhaust gas to the intake line, a high pressure EGR cooler arranged on the high pressure EGR line for cooling re-cycling exhaust gas, and a high pressure EGR valve mounted to the high pressure EGR line for controlling the re-cycling exhaust gas.

The catalyst unit may include a diesel oxidation catalyst (DOC) including an oxidation catalyst, and a diesel particulate filter (DPF) for filtering out particulate material.

In another aspect of the present invention, an engine system for controlling an exhaust gas flow may include an intake line arranged to draw in outdoor air, an engine for combusting the outdoor air supplied through the intake line and fuel in a combustion chamber of the engine to generate torque, an exhaust line for exhausting exhaust gas from the combustion in the combustion chamber of the engine, a turbocharger having a turbine operated by the exhaust gas passing through the exhaust line and a compressor for compressing the outdoor air in the intake line, a catalyst unit arranged on a downstream side of the turbocharger for reducing harmful components of the exhaust gas, a bypass line branched from the exhaust line on the downstream side of the turbocharger and joined to the intake line on an upstream side of the turbocharger, and a bypass valve arranged on the bypass line for selectively opening/closing the bypass line.

The engine system may further include a control unit for selectively opening/closing the bypass valve.

If a condition is met in which the fuel is not injected into the engine and a rotation speed of the engine is higher than a preset speed, the control unit may open the bypass valve so that the exhaust gas bypasses the turbocharger and the catalyst unit. If the condition is not met, the control unit may close the bypass valve.

The control unit may control the bypass valve based on an analysis of an accelerator pedal signal, a coolant temperature of the engine, a vehicle speed, and a signal of a lambda sensor arranged between the turbocharger and the engine.

The engine system may further include a high pressure EGR line branched from the exhaust line between the turbocharger and the engine for re-cycling the exhaust gas to the intake line, a high pressure EGR cooler arranged on the high pressure EGR line for cooling re-cycling exhaust gas, and a high pressure EGR valve mounted to the high pressure EGR line for controlling the re-cycling exhaust gas.

The engine system may further include an intercooler arranged on the intake line between the turbocharger and the engine for cooling the gas compressed by the turbocharger.

To achieve the object of the present invention, in an overrun condition, the imperfectly combusted exhaust gas of the engine is controlled to bypass the catalyst unit for securely maintaining a temperature of the catalyst unit and improving quality of the exhaust gas.

DETAILED DESCRIPTION

An exemplary embodiment of the present invention will hereinafter be described in detail with reference to the accompanying drawings.

Figure 1:
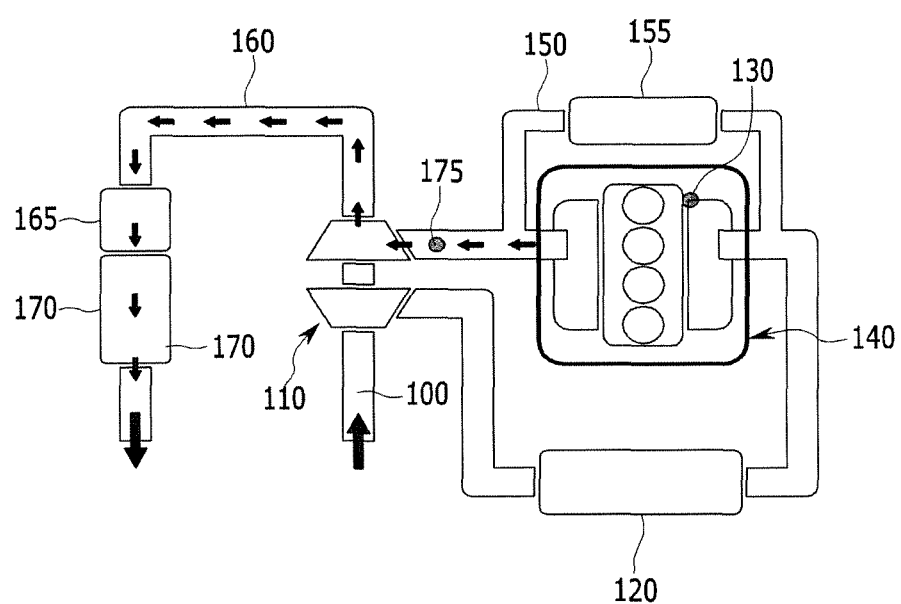
FIG. 1 illustrates a schematic view of an engine system related to the present invention.

FIG. 1 illustrates a schematic view of an engine system related to the present invention.

Referring to FIG. 1, the engine system includes an intake line 100, a turbocharger 110, an intercooler 120, an engine 140, a coolant temperature sensor 130, an exhaust line 160, a diesel oxidation catalyst 165, a diesel particulate filter 170, a high pressure exhaust gas recirculation (EGR) line 150, and a high pressure EGR cooler 155.

Outdoor air is supplied to the turbocharger 110 via the intake line 100. The turbocharger 110 rotates a turbine with the exhaust gas flowing in the exhaust line 160. The turbine compresses the outdoor air flowing in the intake line 100 and supplies the compressed outdoor air to a combustion chamber of the engine 140.

The intercooler 120 cools the intake air flowing in the intake line 100, and the high pressure EGR line 150 re-cycles the exhaust gas exhausted from the combustion chamber of the engine 140 to the intake line 100. The high pressure EGR line 150 has a high pressure EGR valve (not shown) and the high pressure EGR cooler 155 arranged thereto for controlling flow and temperature of the re-cycling exhaust gas, respectively.

A catalyst unit is arranged on the exhaust line 160 on a downstream side of the turbocharger 110, wherein the catalyst unit includes the diesel oxidation catalyst (DOC) 165 and the diesel particulate filter (DPF) 170.

The diesel oxidation catalyst 165 is mainly for reducing harmful materials contained in the exhaust gas, and the diesel particulate filter 170 is mainly for filtering out and removing particulate materials from the exhaust gas.

A lambda sensor 175 is arranged on an upstream side of the turbocharger 110 in the exhaust line 160 for sensing an oxygen concentration contained in the exhaust gas exhausted from the combustion chamber of the engine 140 to output a signal on a lean/rich state of the exhaust gas, and the coolant temperature sensor 130 is arranged adjacent to the engine 140 for sensing a temperature of the coolant circulating in the engine 140.

In the preferred embodiment of the present invention, in the overrun condition, no fuel is injected into the engine 140, and the engine 140 is rotated by a torque transmitted through a drive shaft. For example, when the driver's foot does not depress an accelerator pedal, no fuel is injected from an injector, and the engine rotates at a speed faster than an idle rotation speed.

Therefore, the outdoor air is introduced into the engine 140 through the intake line 100, imperfectly combusted gas of a low temperature which is not burned fully flows through the exhaust line 160, and temperatures of the diesel oxidation catalyst 165 and the diesel particulate filter 170 may sharply drop, making purification characteristics of the diesel oxidation catalyst 165 and the diesel particulate filter 170 poor.

Figure 2:
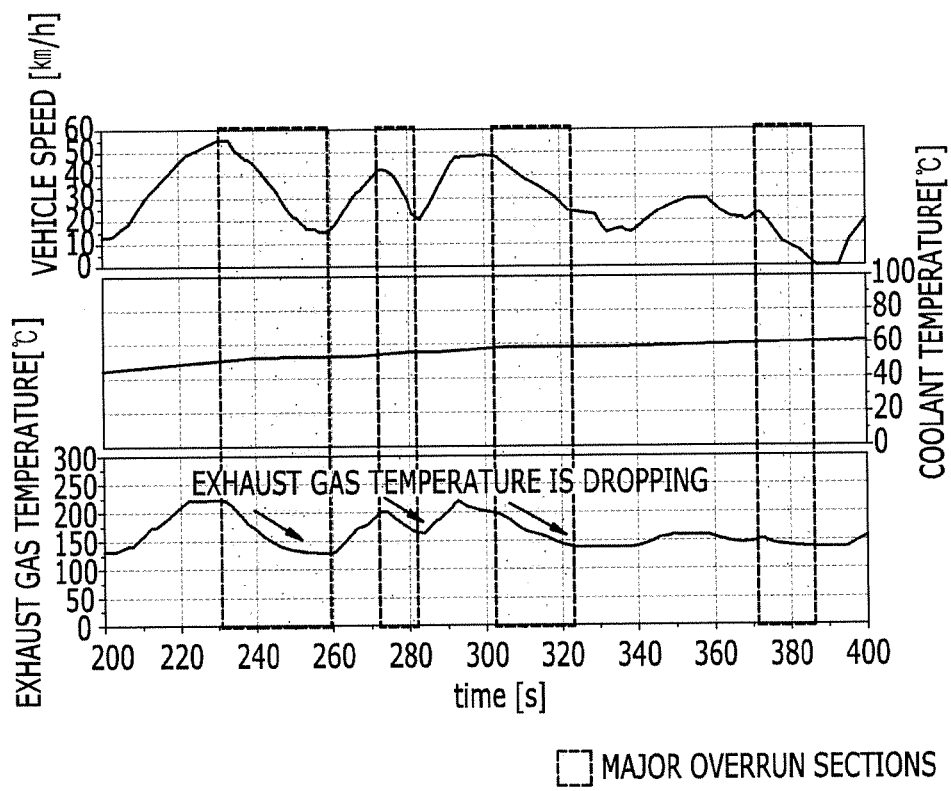
FIG. 2 illustrates a graph showing an overrun section in an engine system related to the present invention.

FIG. 2 illustrates a graph showing an overrun section in an engine system related to the present invention.

Referring to FIG. 2, a horizontal axis denotes a time and a vertical axis denotes an exhaust gas temperature, a coolant temperature, and a vehicle speed. Since no fuel is injected in the overrun condition, the vehicle speed is reduced and the exhaust gas temperature sharply drops, causing the purification characteristic of the catalyst unit, such as the diesel oxidation catalyst 165 or the diesel particulate filter 170, to become poor.

Figure 3:
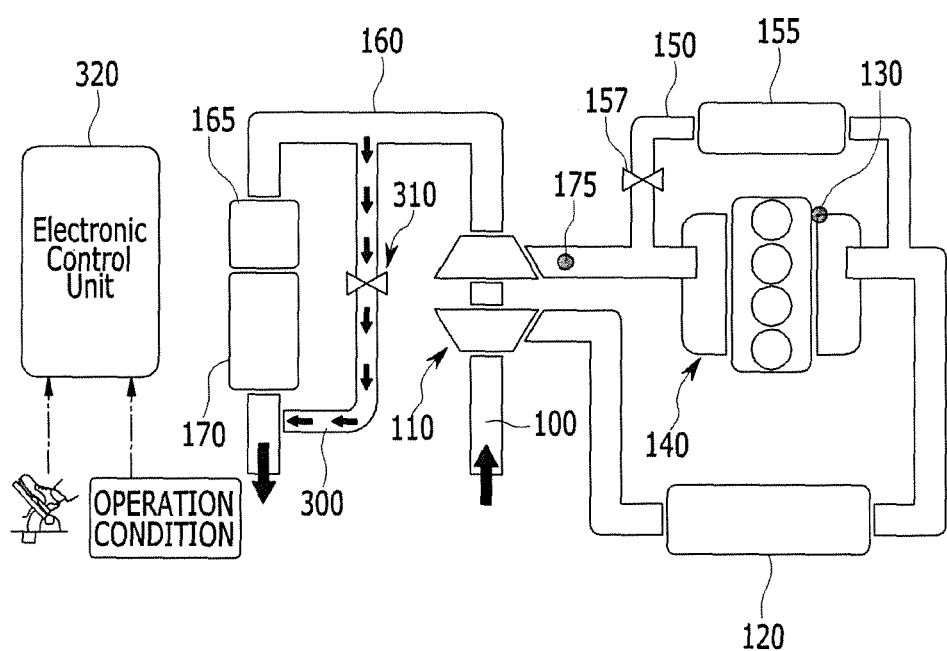
FIG. 3 illustrates a schematic view of an engine system for controlling an exhaust gas flow in accordance with a preferred embodiment of the present invention.

FIG. 3 illustrates a schematic view of an engine system for controlling an exhaust gas flow in accordance with a preferred embodiment of the present invention.

In the intake line 100, a compressor of the turbocharger 110 and the intercooler 120 are arranged in succession, and in the exhaust line 160, a turbine of the turbocharger 110, the diesel oxidation catalyst 165, and the diesel particulate filter 170 are arranged in succession.

The high pressure EGR line 150 is branched from a line between the turbine of the turbocharger 110 and the engine 140 and joins a line between the engine 140 and the intercooler 120. The high pressure EGR line 150 has a high pressure EGR valve 157 and the high pressure EGR cooler 155 arranged thereto for controlling flow and temperature of the re-cycling exhaust gas, respectively. A bypass line 300 is branched from a downstream side of the turbine of the turbocharger 110 and joins a downstream side of the diesel particulate filter 170.

That is, the bypass line 300 is branched from the exhaust line 160 between the turbocharger 110 and the catalyst unit 165 and 170 and joins the exhaust line 160 on a downstream side of the catalyst unit 165 and 170.

The bypass line 300 has a bypass valve 310 arranged thereon. Depending on opening/closing of the bypass valve 310, the exhaust gas flowing in the exhaust line 160 may bypass the diesel oxidation catalyst 165 and the diesel particulate filter 170.

A control unit 320, such as an engine control unit (ECU), receives a coolant temperature from the coolant temperature sensor 130 arranged adjacent to the engine 140, a state of the exhaust gas from the lambda sensor 175, an accelerator pedal operation state, and an operation condition of the engine 140. The operation condition may include a fuel injection rate, a rotation speed of the engine, a vehicle speed, the coolant temperature, an exhaust gas state, and a state of the transmission.

Based on an accelerator pedal state and an operation condition, if the control unit 320 determines that the overrun condition is met, the control unit 320 opens the bypass valve 310 to allow the imperfectly combusted exhaust gas bypass the diesel oxidation catalyst 165 and the diesel particulate filter 170. On the other hand, if the control unit 320 determines that the overrun condition is not met, the control unit 320 closes the bypass valve 310, and thus, the exhaust gas passes through the diesel oxidation catalyst 165 and the diesel particulate filter 170.

The control unit 320 may be at least one microprocessor operated by a predetermined program which may include a series of commands for carrying out a method in accordance with a preferred embodiment of the present invention.

Figure 4:
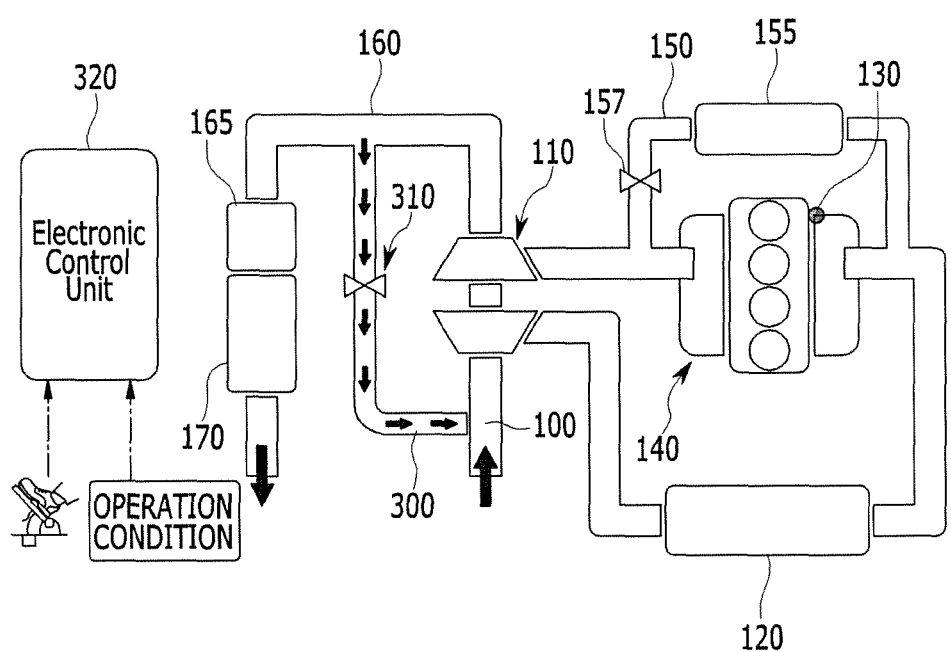
FIG. 4 illustrates a schematic view of an engine system for controlling an exhaust gas flow in accordance with another preferred embodiment of the present invention.

FIG. 4 illustrates a schematic view of an engine system for controlling an exhaust gas flow in accordance with another preferred embodiment of the present invention. Description of parts of FIG. 4 that are similar to those of FIG. 3 will generally be omitted while describing characteristic differences.

Referring to FIG. 4, the bypass line 300 is branched from the exhaust line 160 between the catalyst unit (165 and 170) on a downstream side of the turbine of the turbocharger 110 and the turbocharger 110, and joins the intake line 100 on an upstream side of the compressor of the turbocharger 110.

The bypass line 300 has the bypass valve 310 arranged thereon, and the control unit 320 opens the bypass valve 310 if the overrun condition is met. Then, the imperfectly combusted exhaust gas flowing to the downstream side of the turbine of the turbocharger 110 circulates in the intake line 100 on the upstream side of the compressor of the turbocharger 110, for the exhaust gas to not pass the diesel oxidation catalyst 165 and the diesel particulate filter 170. On the other hand, if the control unit 320 determines that the overrun condition is not met, the control unit 320 closes the bypass valve 310, and thus, the exhaust gas passes through the diesel oxidation catalyst 165 and the diesel particulate filter 170.

As described above, if the imperfectly combusted exhaust gas exhausts in the overrun condition, by opening the bypass valve 310 on the bypass line 300 for the imperfectly combusted exhaust gas to not pass through the diesel oxidation catalyst 165 and the diesel particulate filter 170, the temperature drop of the catalyst unit (the diesel oxidation catalyst 165 and the diesel particulate filter 170) is prevented in advance, thereby securely enabling to maintain the purification rate.

Along with this, an LOT (light off time) period of the catalyst unit may be reduced in a state in which the temperature of the catalyst unit is low, i.e., in a state in which the coolant temperature of the engine is low, before starting.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. An engine system for controlling an exhaust gas flow, comprising:
   an intake line arranged to draw in outdoor air;
   an engine for combusting the outdoor air supplied through the intake line and fuel in a combustion chamber of the engine to generate torque;
   an exhaust line for exhausting exhaust gas from the combustion in the combustion chamber of the engine;
   a turbocharger having a turbine operated by the exhaust gas passing through the exhaust line and a compressor for compressing the outdoor air in the intake line;
   a catalyst unit arranged on a downstream side of the turbocharger for reducing harmful components of the exhaust gas;
   a bypass line branched from the exhaust line on the downstream side of the turbocharger and joined to the exhaust line on a downstream side of the catalyst unit;
   a bypass valve arranged on the bypass line for selectively opening/closing the bypass line; and
   a control unit for selectively opening/closing the bypass valve;
   wherein if a condition is met in which the fuel is not injected into the engine and a rotation speed of the engine is higher than a preset speed, the control unit opens the bypass valve so that the exhaust gas bypasses the turbocharger and the catalyst unit, and if the condition is not met, the control unit closes the bypass valve, and
   wherein the control unit controls the bypass valve based on an analysis of an accelerator pedal signal, a coolant temperature of the engine, a vehicle speed, and a signal of a lambda sensor arranged between the turbocharger and the engine.

2. The engine system of claim 1, further comprising:
   a high pressure exhaust gas recirculation (EGR) line branched from the exhaust line between the turbocharger and the engine for re-cycling the exhaust gas to the intake line;
   a high pressure EGR cooler arranged on the high pressure EGR line for cooling re-cycling exhaust gas; and
   a high pressure EGR valve mounted to the high pressure EGR line for controlling the re-cycling exhaust gas.

3. The engine system of claim 1, wherein the catalyst unit includes:
   a diesel oxidation catalyst (DOC) including an oxidation catalyst; and
   a diesel particulate filter (DPF) for filtering out particulate material.

4. An engine system for controlling an exhaust gas flow comprising:
   an intake line arranged to draw in outdoor air;
   an engine for combusting the outdoor air supplied through the intake line and fuel in a combustion chamber of the engine to generate torque;
   an exhaust line for exhausting exhaust gas from the combustion in the combustion chamber of the engine;
   a turbocharger having a turbine operated by the exhaust gas passing through the exhaust line and a compressor for compressing the outdoor air in the intake line;
   a catalyst unit arranged on a downstream side of the turbocharger for reducing harmful components of the exhaust gas;
   a bypass line branched from the exhaust line on the downstream side of the turbocharger and joined to the intake line on an upstream side of the turbocharger; and
   a bypass valve arranged on the bypass line for selectively opening/closing the bypass line.

5. The engine system of claim 4, further comprising a control unit for selectively opening/closing the bypass valve.

6. The engine system of claim 5, wherein:
   if a condition is met in which the fuel is not injected into the engine and a rotation speed of the engine is higher than a preset speed, the control unit opens the bypass valve so that the exhaust gas bypasses the turbocharger and the catalyst unit, and
   if the condition is not met, the control unit closes the bypass valve.

7. The engine system of claim 6, wherein the control unit controls the bypass valve based on an analysis of an accelerator pedal signal, a coolant temperature of the engine, a vehicle speed, and a signal of a lambda sensor arranged between the turbocharger and the engine.

8. The engine system of claim 4, further comprising:
- a high pressure exhaust gas recirculation (EGR) line branched from the exhaust line between the turbocharger and the engine for re-cycling the exhaust gas to the intake line;
- a high pressure EGR cooler arranged on the high pressure EGR line for cooling re-cycling exhaust gas; and
- a high pressure EGR valve mounted to the high pressure EGR line for controlling the re-cycling exhaust gas.

9. The engine system of claim 4, further comprising an intercooler arranged on the intake line between the turbocharger and the engine for cooling the gas compressed by the turbocharger.

* * * * *